United States Patent [19]

Osborne

[11] 3,997,385
[45] Dec. 14, 1976

[54] CLAMPING OF FILM-LIKE MATERIAL FOR RADIANT ENERGY WELDING

[75] Inventor: Richard F. Osborne, Mauldin, S.C.

[73] Assignee: W. R. Grace & Co., Duncan, S.C.

[22] Filed: Aug. 18, 1975

[21] Appl. No.: 605,361

[52] U.S. Cl. .............................. 156/272; 156/285; 156/380; 156/497

[51] Int. Cl.² .................. B29C 19/02; B29C 17/00; B32B 19/02

[58] Field of Search .......... 156/272, 285, 380, 497, 156/499, 583

[56] References Cited
UNITED STATES PATENTS 2,705,523  4/1955  Hasselquist .................... 156/285
3,560,291  2/1971  Foglia et al. .................... 156/272
3,740,287  6/1973  Eichhorn ........................ 156/272

*Primary Examiner*—Douglas J. Drummond
*Attorney, Agent, or Firm*—John J. Toney; William D. Lee, Jr.; John B. Hardaway

[57] ABSTRACT

Sheets of film-like material such as thermoplastic sheets, coated paper, or metallic foil may be clamped together for radiant energy welding by directing jets of gas against the outer surfaces of two opposed sheets to press or clamp the sheets firmly into contact with each other; and, then by irradiating the contact area to heat the material to its welding temperature, the sheets will be fused together.

14 Claims, 3 Drawing Figures

CLAMPING OF FILM-LIKE MATERIAL FOR RADIANT ENERGY WELDING

FIELD OF THE INVENTION

This invention relates generally to pneumatic clamping of film like material in order to perform an operation upon the clamped material which normally can not be performed when the material is mechanically clamped. Specifically, the invention relates to the clamping of film-like material in order to weld portions of the material together by radiant energy means such as lasers or electrons.

BACKGROUND OF THE INVENTION

Many materials such as thermoplastic film, metal foil, and flattened thermoplastic tubing are manufactured in a sheet-like form and in order to form a useful product from the material it is necessary to seal the sheet-like material to itself or to a similar material. If the material is thermoweldable or heat fusible it may be sealed to itself or a similar material by the proper application of energy which raises the temperature of the material to its welding or fusing temperature. Thermoplastic sheets such as polyethylene, polypropylene, polyvinyl chloride, polyvinylidene chloride, etc. are readily heat sealable or heat weldable; and, in the prior art, sealing or welding has been accomplished by pressing two sheets of thermoplastic film together between heated seal bars, by mechanically pressing the sheets together and applying radio frequency energy, and by applying heated and compressed air blown through two opposite nozzles to seal the material together. One example of this latter described method is set forth in U.S. Pat. No. 3,278,358 which issued on Oct. 11, 1966 to Horst Rosewicz et al. An earlier example of forming heat seals by directing opposed currents of warm gas against opposed exterior surfaces of thermoplastic materials to bring them to their temperature of fusion is disclosed in U.S. Pat. No. 2,423,327 which issued on July 1, 1947 to A. B. Haslacher. Other prior art showing the use of heated air as a source of energy for welding thermoplastic surfaces together are U.S. Pat. No. 2,978,008 which issued on Apr. 4, 1961 to John D. Conti and U.S. Pat. No. 3,488,244 which issued on Jan. 6, 1970 to J. G. Lepisto. While a process employing heated air will seal together two thermoplastic surfaces such a process is relatively slow for industrial processes as the heated air must transfer heat to the thermoplastic material at its surface where heat transfer efficiency is low, and then all of the heat energy must be conducted from the surface across the entire interior of the material before it will heat to its flow or fusing temperature. The process of conduction from the surface to the interior for a thermoplastic material is a relatively slow one. Accordingly, it is one object of the present invention to provide a process which is rapid and does not depend upon heat conduction in order to produce a thermoweld.

Certain forms of radiant energy such as laser beams of certain wave lengths and electron beams will rapidly heat the entire volume of the irradiated material to its welding temperature. However, mechanical clamps or other means of holding sheets of thermoweldable material in close contact tend to interfere with the radiant energy beam and prevent complete irradiation of the target area. Accordingly, it is another object of the present invention to provide a method of holding sheets of thermoweldable material together which does not interfere with the irradiation of the material by radiant energy.

The accomplishment of the foregoing and other objects will be apparent to those skilled in the art from the following Summary of the Invention and Detailed Description of the preferred embodiments.

SUMMARY OF THE INVENTION

In one aspect, the subject invention is a method of clamping sheets of film-like material together for radiant energy welding by placing two sheets of weldable material in opposed, face-to-face relationship; directing jets or streams of gas against the opposite, outer surfaces or externally exposed surfaces of said sheets to press and clamp the sheets firmly into contact with each other; and, irradiating the area of contact of the sheets to heat the material to its welding temperature thereby fusing said sheets together in their area of contact. While the cross sectional area of said jets or streams of gas may be circular in cross-section, for most applications it is desired that the cross section be slot shaped or the shape of a thin elongated rectangle. The invention is readily applicable to thermowelding of single layer, laminated, or coated thermoplastic sheets or flattened tubing with laser energy or with electron beams; but, by selection of the appropriate wave length laser or by the proper application of a scanned electron beam, metal foils may also be welded together.

In another aspect of the present invention, the sheets to be sealed together may be positioned vertically with pairs of jets on both sides of the vertical sheets and the radiant energy applied to the area where the impingement of the gas upon the sheets causes them to be pressed and clamped together.

In still another aspect, the subject invention is an apparatus for clamping sheets of film-like material together for radiant energy welding which comprises aligned, opposed gas jets for directing gas streams against sheets which are placed in face-to-face relationship between the jets; means for supplying gas to said jets and thereby pressing and clamping said sheets together; and, means for irradiating the area where the sheets are clamped together with radiant energy. Preferably, the means for irradiating the area of contact is a laser means or electron beam means. Also, the jets can be arranged to be either horizontally or vertically opposed or the jets may be opposed at intermediate angles depending upon the direction at which it is desirable to pass the material between the jets. Furthermore, if the radiant energy need only be applied from one side, the jet of air need only be applied from that same side of the opposed sheets if the other side contacts a firm support member such as a roller mounted opposite the jets.

IN THE DRAWINGS

In the drawings which are appended hereto and made a part of this disclosure:

DEFINITIONS

As used herein, the terms listed below will be understood to have the meaning specified:

Weld means uniting by heating and allowing the materials to flow together where the materials are either plastic or metals. Welding temperature means the temperature at which the particular material will flow and achieve a weld. When referring to thermoplastics, welding and heat sealing will generally be used interchangeably.

Radiant energy is energy passed on or transmitted as electromagnetic radiation.

Radiation is energy emitted or propagated through space or a medium as waves or as particles. Common forms of radiation are light, X-rays, gamma-rays, and electrons.

Laser means light amplification by stimulated emission of radiation. The energy is electromagnetic radiation in the ultra violet, visible, or infra red regions of the spectrum and tends to be monochromatic with little divergence in a beam.

Jet means both a forceful stream of fluid or gas discharged from a narrow opening or nozzle and the spout or nozzle itself.

Irradiation means the application of radiant energy to a surface or article or the exposure of a surface to radiant energy or radiation.

PREFERRED EMBODIMENTS

Figure 1:
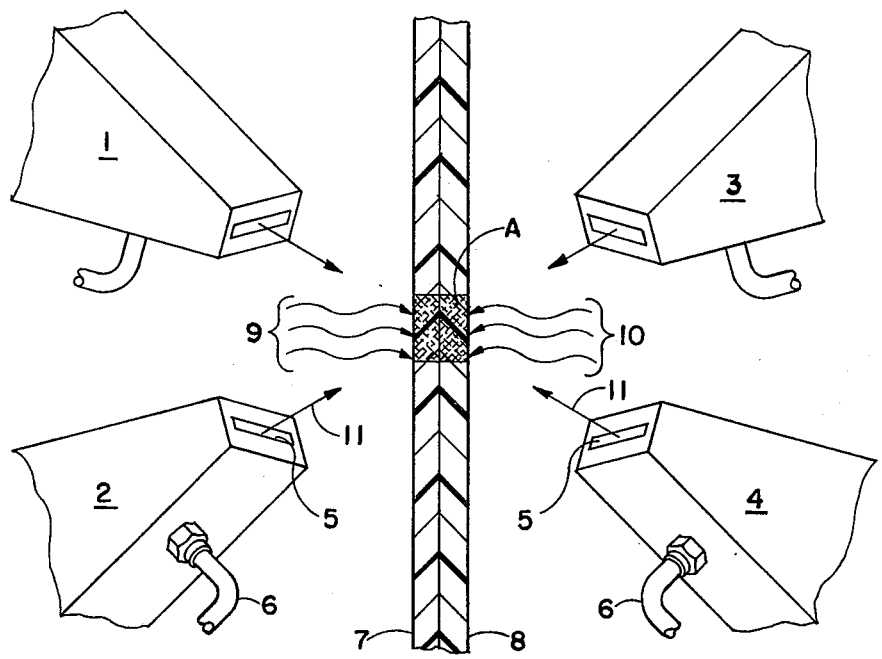
FIG. 1 is a schematic representation of a preferred embodiment of the subject invention showing a pair of gas jets on both sides of two vertical sheets of film which are irradiated in their area of contact.

In FIG. 1 a schematic representation of a preferred embodiment of the subject invention is shown. Jets or jet nozzles 1 and 2 are shown positioned on the left side of two vertical, face-to-face, opposed film sheets 7 and 8 which are shown in cross section. On the right hand side, two similar jets or jet nozzles 3 and 4 are shown. Both the left hand pair of jets 1 and 2 and the right hand pair of jets 3 and 4 are directed towards the same area, A, of the sheets 7 and 8 and area A is characterized by additional cross hatching. Air or gas 11 which emerges from the slot shaped orifices or openings for the jets 1, 2, 3, and 4 impinges on area A at an angle of 30° to 60° with the vertical and presses the sheets into close contact thereby effecting a clamping action. A slot shaped orifice 5 is preferred where welding is to take place across the entire width of the sheets 7 and 8. In this case, the width of the orifice 5 should be at least as wide as the sheets.

Figure 2:
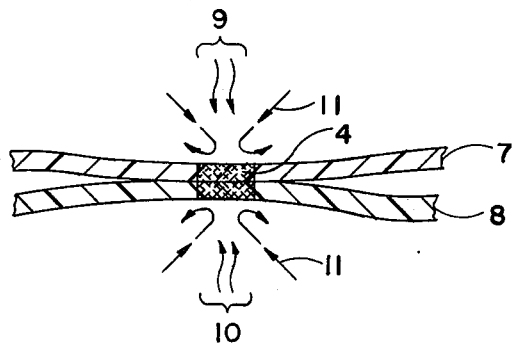
FIG. 2 is a representation of the cross-section of two segments of film being clamped together for radiant energy welding according to the present invention; and, FIG. 3 shows one preferred embodiment of the subject invention using laser beams as the preferred irradiation means.

FIG. 2 shows in exaggerated detail the clamping effect of the film in FIG. 1 due to the impingement of the air currents 11 against the outer surfaces of the sheets 7 and 8. This air or gas is delivered to the jets 1, 2, 3, and 4 in the form of compressed gas or air through supply lines 6. Depending upon the distance of the orifice 5 from the sheet and the thickness of the material and its stiffness, the pressure and flow of the compressed air will vary according to requirements. Also, the width of the opening of the orifice may be varied but it is desirable to use as narrow an opening as practical. A suitable opening width range is from 0.050 to 0.250 inches with the length of the opening being at least as long as the sheets are wide. Furthermore, it has been found that the distance from the orifice to the sheet should be as close as practical and a workable distance is in the order of ¼ inches.

When the sheets are suitably clamped together under the influence of the opposed jets of air or gas, radiant energy may be applied to the area A to irradiate and heat the sheet material. The radiant energy is represented by arrows 9 and 10 in FIGS. 1 and 2. A particularly suitable form of radiant energy is infrared energy in the form of a coherent beam produced by a laser. For thermoplastic materials, the photons having a 10.6 micron wave length which are emitted by the $CO_2$ gas laser are in the infrared portion of the spectrum and are readily absorbed in thermoplastic material. The intense concentration of 10.6 micron energy occasioned by the irradiation of the small area of the sheet material by the photons in the laser beam rapidly increases the activity of the molecules of the material thus bringing it quickly to its fusing or welding temperature. By comparison, the commonly used radio frequency systems for sealing thermoplastic materials require a pulse with a duration of about 0.25 seconds while the dwell time or pulse time required for laser sealing on equivalent material is of the order of 0.125 seconds. Thus, both time and energy are conserved.

The generation of laser beams and the optics associated therewith to focus a beam upon a given area is well known in the art. A suitable gas $CO_2$ laser is manufactured by Coherent Radiation, Inc., Palo Alto, Calif., and a suitable lens system can be assembled from custom fabricated lenses using well known techniques and material of the optical industry, e.g. II–VI, Inc. Corporation of Glenshaw, Pennsylvania.

Figure 3:
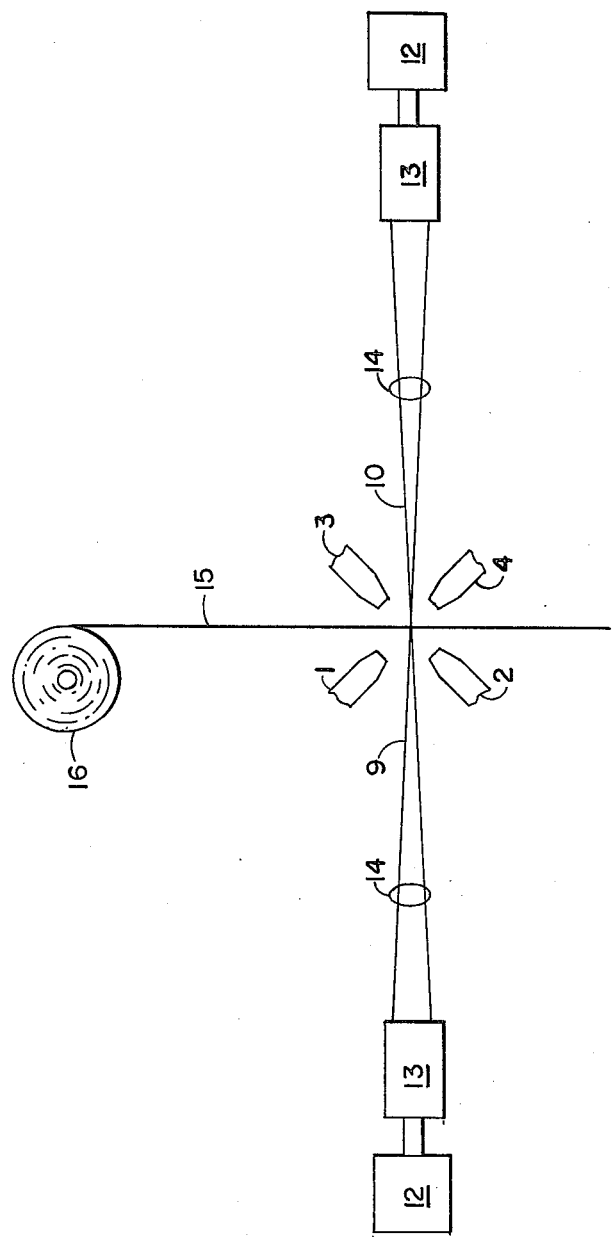

One embodiment of the present invention employing lasers as the irradiation means is shown in FIG. 3 where flattened tubing 15 of thermoplastic material is fed vertically downwardly from roll 16. Tubing when flattened obviously forms two opposed, face-to-face sheets of material. The flattened tubing 15 is centered between the first pair of jets 1 and 2 and the second pair of jets 3 and 4 which are aligned horizontally so that compressed air or gas emerging from the nozzles of the respective jets will impinge on an area of the flattened tubing 15 at the same vertical height and horizontally across the tubing. A typical width of flattened thermoplastic tubing will be about 15 inches and each sheet in the tubing will be in the range of 0.001 to 0.025 mils thick. Typical thermoplastic material includes polyethylene, ethylene/vinyl acetate copolymer, ionomer, polypropylene, nylon, polyvinylidene chloride copolymers, and ethylene/vinyl alcohol copolymers.

In order to heat the thermoplastic material with sufficient rapidity, laser beams 9 and 10 are directed from both sides of the flattened tubing 15 and are focused upon the area which is clamped together by the action of the gas jets. The beam is focused by lens 14 after having passed through beam expander 13 after originating from the $CO_2$ gas laser generator 12. The beam is in the nature of a spot or point and may be scanned horizontally across the width of the flattened tubing 15 or the flattened tubing itself may be moved horizontally. Once the seal is made by a simultaneous pulse from each of the laser generators, the tubing is moved downwardly and may be cut appropriately to form bags.

An electron beam may be substituted for the laser apparatus. Electron accelerators and scanners are readily available commercially and by choosing the appropriate electron energy and using a pencil line scanner a suitable weld may be made across two sheets of opposed film which are held by the pneumatic clamp of the present invention.

It has been found highly desirable in the present invention that the radiant energy be applied from both sides or, rather, to both outer surfaces of the opposed sheet material because if all of the energy is applied from one side there is a tendency to overmelt or burn the layer adjacent to the energy source before sufficient energy is transmitted to the other side thus greatly weakening any seal that is made. Thus, simultaneous application of energy from opposed sides produces the most satisfactory seal.

It has also been found that the jets and the energy beams should be independent of each other as a laser beam or electron beam diverges too much to the applied coaxially with the air, i.e. a laser beam would diverge and be wider than the opening width of the orifice for the jets.

Having thus described my invention, I claim:

1. A method of clamping and welding sheets of thermoplastic material together with radiant energy comprising the steps of:
   a. positioning two sheets of thermoplastic material in a vertically opposed, face-to-face relationship;
   b. placing a pair of jets adjacent the outer surface of each of said sheets, each of said jets being slot-shaped and opposed to the other pair of said jets;
   c. supplying a gas to said jets;
   d. directing both jets in the same pair of jets so that gas emerging therefrom impinges on the same area of said outer surface of said sheets thereby pressing and clamping said sheets into contact in said area; and,
   e. irradiating said clamped area with radiant energy to heat the material to its welding temperature thereby fusing said sheets together in their area of contact.

2. The method of claim 1 wherein the step of positioning two sheets of thermoplastic material is performed by vertically suspending flattened thermoplastic tubing.

3. The method of claim 2 wherein said thermoplastic tubing is irradiated across its width to form a horizontal weld.

4. The method of claim 1 wherein said radiant energy is laser energy.

5. Apparatus for clamping and welding sheets of film-like material together with radiant energy comprising:

a. aligned, opposed gas jets for directing gas streams against said sheets which are placed in face-to-face relationship between said jets;
   b. means for supplying gas to said jets and thereby pressing and clamping said sheets together; and,
   c. means for irradiating the area where said sheets are clamped together with radiant energy.

6. The apparatus of claim 5 wherein said jets are slot-shaped.

7. The apparatus of claim 5 wherein the means for irradiating said area is laser means.

8. The apparatus of claim 5 wherein the means for irradiating said area is an electron beam.

9. The apparatus of claim 5 wherein said jets are two pairs of opposed jets.

10. The apparatus of claim 9 wherein said jets are horizontally opposed so that said film-like material may move vertically therebetween.

11. A method of clamping and welding sheets of film-like material together with radiant energy comprising the steps of:
    a. placing two sheets of weldable material in opposed, face-to-face relationship;
    b. positioning a pair of gas jets on opposite sides of said opposed sheets;
    c. directing each jet of gas in said pair against the same surface area of the respective sheet to press and clamp the sheets firmly into contact with each other; and,
    d. irradiating at least a portion of the area of contact of said sheets to heat the material to its welding temperature thereby fusing said sheets together in their area of contact.

12. The method of claim 11 wherein said area of contact is irradiated by radiation which passes between the jets in each pair on opposite sides of the film.

13. The method of claim 11 wherein the irradiation of the area of contact is by directing a laser beam thereupon.

14. The method of claim 11 wherein the irradiation of the area of contact is by directing a beam of electrons thereupon.

* * * * *